Jan. 26, 1965 R. H. GARRITT, JR 3,166,967
CUTTING BLOCKS
Filed Aug. 18, 1960
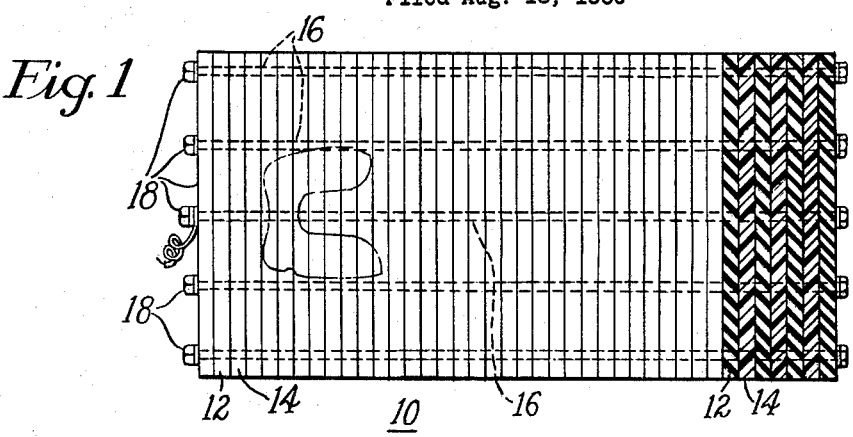
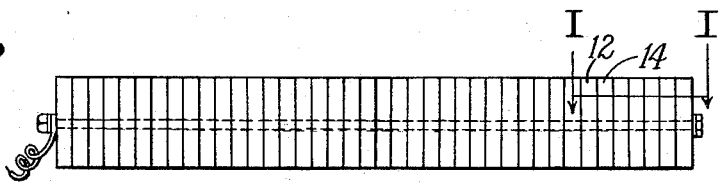
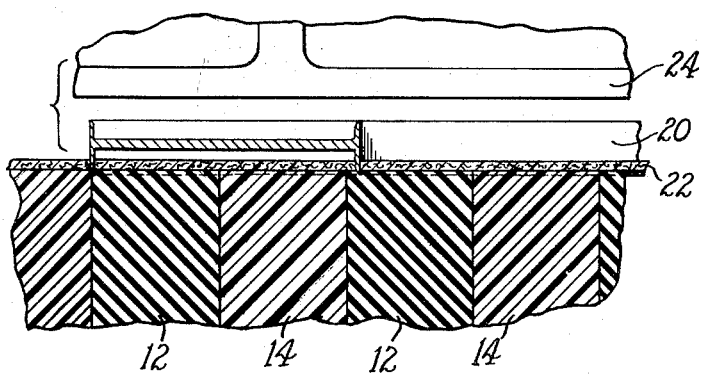
Inventor
Robert H. Garritt, Jr.
By his Attorney … # 3,166,967
CUTTING BLOCKS
Robert Hall Garritt, Jr., Dover, Mass., assignor to United Shoe Machinery Corporation, Flemington, N.J., a corporation of New Jersey
Filed Aug. 18, 1960, Ser. No. 50,383
1 Claim. (Cl. 83—658)

This invention relates generally to cutting blocks for use with die cutting presses of the type commonly known as clicking machines.

Presses of this type are used extensively in the shoe industry for cutting leather into various shapes, and utilize a press bed carrying a cutting block, and a cantilever beam overhanging the block for forcing a cutting through one or more layers of material lying on the cutting block.

To avoid undue wear of the cutting block, it is desirable to control closely the amount of penetration of the cutting die into the block on a cutting stroke. Since the various dies used for cutting out shoe parts frequently have different heights, it has been found convenient to control the stroke of the beam electrically, by providing a conductive cutting block, with means for detecting the contact of the cutting edge of the die with the cutting block to stop the downward movement of the beam. A press operating on this principle is disclosed in United States Letters Patent No. 2,788,070, issued April 9, 1957, to Seabury et al. As shown therein the cutting stroke of the beam is actuated by hydraulic means controlled by a solenoid reversing valve.

The solenoid valve is controlled by a suitable electric circuit, so arranged that on contact of the die with the cutting block, a circuit is completed which reverses the solenoid valve to reverse the motion of the beam.

This form of press is capable of faster and better cutting with longer life of both the cutting block and the dies, by reason of the close control over the penetration of the die into the block.

The conductive cutting blocks for use with machines of this type are normally compounded of natural or synthetic rubber, organic plastics or mixtures thereof, with sufficient carbon black, such as lampblack or thermal black to render it conductive. However, it has been found that the compositions of material which have adequate conductivity do not have the greatest wear resistance, and also are more expensive to manufacture than nonconductive blocks.

The object of this invention is to provide a conductive cutting block for the above purpose having a cutting surface composed partly of conductive and partly nonconductive cutting block material.

A further object of the invention is to provide a cutting block comprising alternate vertical plies of conductive and nonconductive cutting block material having substantially the same hardness.

Other objects will be obvious to one skilled in the art from the following description of a specific embodiment thereof.

In the drawings,

FIG. 1 is a top plan view of a cutting block embodying the features of the invention;

FIG. 2 is a view in side elevation of the cutting block of FIG. 1; and

FIG. 3 is an enlarged view in section of a portion of the cutting block of FIG. 1 with an associated cutting die at the end of a cutting stroke.

Referring to the drawing, there is illustrated a cutting block 10, which is particularly adapted for use with a die cutting machine of the type that utilizes the conductivity of the cutting block to limit the downward motion of the cutting knife.

In the illustrated embodiment, the block 10 comprises a plurality of sections 12 of nonconductive cutting block material with sections 14 of conductive cutting block material interposed therebetween. The sections 12 and 14 are provided with suitable transverse apertures allowing them to be assembled onto retaining rods 16 and are held tightly together by means of nut 18.

The individual sections 12 and 14 may be fabricated by molding pads of the appropriate type of cutting block material, said pads having a thickness equal to the desired width of the sections and cutting the pads into sections having a width equal to the desired height of the cutting block. The apertures for the rods 16 may then be formed in the sections, and the sections 12 and 14 assembled into the rods alternately, so that the edges of the sections form the cutting surface of the block.

The nonconductive sections 12 may be formed of any suitable nonconductive cutting block material. Compositions for this purpose are well known and include, but are not limited to natural and synthetic rubber, plastics, fibrous materials, and combinations thereof.

The conductive sections 14 may be formed of any suitable cutting block material having sufficient conductivity to actuate the control circuits of the machine, and preferably have a conductivity such that the resistance of the assembled block is less than about 50,000 ohms. Compositions of material meeting these requirements are well known, and include but are not limited to natural and artificial rubber, plastics, fibrous materials and combinations thereof, with sufficient conductive particles dispersed therein to provide the desired conductivity. Conductive particles suitable for this purpose include carbon black, such as lampblack or thermal black, and metallic particles such as zinc dust.

For reasons to appear hereinafter, it is desirable that the conductive and nonconductive sections have substantially the same hardness.

Example 1

To construct a cutting block in the manner set out above, two groups of pads were molded, one group being composed of nonconductive cutting block material, the other group being composed of conductive cutting block material. Each pad was 20 inches wide, 40 inches long, and 1 inch thick.

The conductive pads were composed of a phenolic resin modified butadiene-acrylonitrile copolymer rubber of the following composition:

| | Parts by weight |
|---|---|
| Butadiene-acrylonitrile copolymer rubber (Hycar 1025) | 39 |
| Phenolic resin (Durez 12686) | 28 |
| Thermal carbon black | 49 |
| Zinc oxide | 2 |
| Sulphur | .6 |
| Anti-oxidant (phenyl beta napthylamine) | .46 |
| Hexamethylene tetramine | 2.47 |
| Stearic acid | .62 |

Hycar 1052 is manufactured by the B. F. Goodrich Company and is understood to contain about 33% acrylonitrile.

Durez 12686 is a thermosetting reaction product of cashew nutshell oil and another phenol with an aldehyde, manufactured by Durez Plastics and Chemicals, Inc., of North Tonawanda, New York. The method of manufacture and properties of this type of resin are disclosed in United States Letters Patent No. 2,203,206, issued June 4, 1940, to Shepard et al.

The nonconductive pads were composed of a high styrene-butadiene resin-modified styrene-butadiene rubber having the following composition:

| | Parts by weight |
|---|---|
| High styrene-butadiene resin (Marbon 8000) | 60 |
| Styrene-butadiene rubber (SBR 1502) | 40 |
| Stearic acid | .5 |
| Zinc oxide | 3.0 |
| Calcium carbonate | 50 |
| Calcium silicate | 50 |
| Amine acetate | 15 |
| Benzothiazyl disulfide | 1.5 |
| Zinc dimethyl dithiocarbamate | .2 |
| Sulphur | 3.0 |
| Carbon black (channel) | 3.0 |

Marbon 8000 is manufactured by the Marbon Corp. of Gary, Indiana, and is understood to contain in excess of about 60% styrene, SBR 1502 is manufactured by the B. F. Goodrich Co. and is understood to contain 23.5% styrene.

The molded pads were then cut transversely into sections 3 inches wide and provided with suitably positioned apertures to receive the retaining rods. Conductive and nonconductive sections were then assembled alternately onto rods in the manner previously described. One of the rods had a diameter slightly greater than that of the apertures in the conductive section, to insure good electrical contact between the rods and the conductive sections.

The hardness of the sections, measured on the cutting surface, was found to be 70 in the durometer C scale for both the conductive and nonconductive sections.

The conductivity of the block was tested in the following manner. The block was placed on a metal support plate. A circular cutting die 2" in diameter, having a stop to limit penetration to $\frac{1}{32}$ of an inch, was forced against the cutting surface of the work with a force of 2500 pounds, which was sufficient to accomplish maximum penetration. The resistance through the block between the die and the support was then measured with an ohmmeter and found to be 10,000 ohms.

The block was then placed into service on a clicking machine of the type described for an extended period. Wear of the block surface was not excessive, and the resistance as measured above was found to be about 20,000 ohms.

Referring to FIG. 3, there is illustrated an enlarged view of the cutting block of FIG. 1, showing a cutting die 20 engaging the block after having cut through a piece of material 22 such as leather or the like under the impetus of the clicker beam 24.

To obtain a clean cut of the material throughout the entire periphery of the die, it is necessary that the cutting edge penetrate the block for at least a short distance. This distance may be controlled by an adjustable time delay circuit, as described in the above-mentioned Patent No. 2,788,070, to enable the operator to compensate for the type of material being cut, and for uneven wear of the cutting surface and the cutting edge of the die.

Hence, in prolonged use the penetration of the block by the cutting dies causes gradual attrition of the cutting surface. An important feature of the type of block set out in the above example is the fact that since the conductive and nonconductive sections have the same hardness, attrition of the conductive and nonconductive block sections occurs at substantially the same rate, so that the cutting surface remains relatively even.

Although the width of the sections 12 and 14 is not critical it is desirable that they be relatively narrow to insure that when small dies are being used for cutting, the die will contact at least one conductive section regardless of its orientation on the block.

The width of the conductive and nonconductive sections need not be the same. In some cases it may be desirable to provide conductive sections which are relatively thin in relation to the width of the nonconductive sections, and more than one nonconductive section may be interposed between each pair of conductive sections.

Since other changes may be made without departing from the scope of the invention, it is intended that all matter contained herein be interpreted in an illustrative and not in a limiting sense.

Having just described my invention what I claim as new and desire to secure by Letters Patent of the United States is:

A cutting block for use with a die cutting machine of the type that utilizes the completion of an electric current between the die and the block to limit the downward movement of the die, said block being formed of a plurality of separate sections of non-conductive material suitable for use as a cutting surface with a machine of the type described, said material being selected from the group consisting of natural and synthetic rubber, synthetic organic plastics and combinations thereof, a layer of conductive material disposed between adjacent non-conductive sections and extending to the cutting surface thereof, and a plurality of retaining rods extending transversely through the sections, means on the ends of the rods compressing the sections tightly together, each of said layers of conductive material being in electrical contact with the same one of said rods.

References Cited by the Examiner

UNITED STATES PATENTS 2,783,838   3/57   Ericson _____ 83—658

FOREIGN PATENTS 699,112   12/30   France.
690,342   4/53   Great Britain.
741,044   11/55   Great Britain.

ANDREW R. JUHASZ, *Primary Examiner.*

HUNTER C. BOURNE, JR., CARL W. TOMLIN,
*Examiners.*